United States Patent
Falash et al.

(10) Patent No.: US 7,991,729 B2
(45) Date of Patent: Aug. 2, 2011

(54) SCENARIO WORKFLOW BASED ASSESSMENT SYSTEM AND METHOD

(75) Inventors: Mark D. Falash, Oviedo, FL (US); Kenneth B. Donovan, Daytona Beach, FL (US); Peter Bilazarian, Mount Laurel, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 637 days.

(21) Appl. No.: 11/867,328

(22) Filed: Oct. 4, 2007

(65) Prior Publication Data

US 2008/0026348 A1    Jan. 31, 2008

Related U.S. Application Data

(63) Continuation of application No. 10/870,879, filed on Jun. 17, 2004, now abandoned.

(51) Int. Cl.
G06F 15/00    (2006.01)
(52) U.S. Cl. .......................................... 706/62
(58) Field of Classification Search ...................... 706/62
See application file for complete search history.

(56) References Cited

U.S. PATENT DOCUMENTS

| | | |
|---|---|---|
| 5,597,312 A | 1/1997 | Bloom |
| 5,815,152 A | 9/1998 | Collier |
| 5,863,208 A | 1/1999 | Ho |
| 6,053,737 A | 4/2000 | Babbitt |
| 6,106,297 A | 8/2000 | Pollak |
| 6,161,101 A | 12/2000 | Guinta |
| 6,428,323 B1 | 8/2002 | Pugh |
| 6,652,283 B1 | 11/2003 | Van Schaack |
| 6,712,638 B2 * | 3/2004 | Fisher et al. .................. 439/374 |
| 2003/0091968 A1 | 5/2003 | Eggert |
| 2004/0249678 A1 | 12/2004 | Henderson |

FOREIGN PATENT DOCUMENTS

| | | |
|---|---|---|
| CA | 2162817 A | 5/1996 |
| WO | WO 00/38140 A1 | 6/2000 |
| WO | WO 2005/036500 A1 | 4/2005 |

OTHER PUBLICATIONS

Rijk et al ("Using Crisiskit and Moped to Improve Emergency Management Team Training" May 2004).*
Allen et al ("Usability Analysis of a Personal Digital Assistant Based Data Collection Tool for the Shipboard Training Environment" Oct. 2003).*
Allen et al ("Usability Analysis of a Personal Digital Assistant Based Data Collection Tool for the Shipboard Training Environment" Oct. 13-15, 2003).*
Australian Patent Office Examination Report for corresponding Singapore application 200503878-1, Sep. 26, 2006.
Australian Patent Office Search Report for corresponding Singapore application 200503878-1, Sep. 26, 2006.
Australian Patent Office Written Opinion for corresponding Singapore application 200503878-1, Sep. 26, 2006.

(Continued)

*Primary Examiner* — Michael B Holmes
*Assistant Examiner* — Lut Wong
(74) *Attorney, Agent, or Firm* — Withrow & Terranova, PLLC

(57) ABSTRACT

A system and a method for automating performance assessments of an exercise or a training activity provide event assessment information in real-time to one or more evaluators in conjunction with unfolding events. The evaluators can wirelessly communicate assessment information to a database for after action review (AAR).

22 Claims, 4 Drawing Sheets

OTHER PUBLICATIONS

Johnston, J.H. et al., "Event-Based Performance Measurement System," 1995 proceedings of the Symposium on Command and Control Research and Technology, Jun. 1995 (pp. 257-276).

Zachary, W., "The Advanced Embedded Training System (AETS): An Intelligent Embedded Tutoring System for Tactical Team Training," International Journal of Artificial Intelligence in Education (1999), pp. 257-277.

* cited by examiner

Fig. 3

| EVENT # | CLOCK TIME | START TIME | LOCATION | INJECT FROM | INJECT TO | THEME | EVENT DESCRIPTION | TRIGGER |
|---|---|---|---|---|---|---|---|---|
| 2100.0 | 9:10 | 7/3/03 14:00 | TX-SOC | Media: Dallas | TX-SOC Command | Media: Dallas Hospital Crowd | Media Inquiry: Dallas hospitals have crowds blocking access | Telcon with Media Dallas |

Fig. 4

| EVENT # | CLOCK TIME | START TIME | LOCATION | INJECT FROM | INJECT TO | THEME | EVENT DESCRIPTION | TRIGGER |
|---|---|---|---|---|---|---|---|---|
| 2100.0 | 9:10 | 7/3/03 14:00 | TX-SOC | Media: Dallas | TX-SOC Command | Media: Dallas Hospital Crowd | Media Inquiry: Dallas hospitals have crowds blocking access | Telcon with Media Dallas |
| 2100.1 | 9:13 | 7/3/03 14:00 | TX-SOC | TX-SOC Command | TX-SOC JIC liaison | Media: Dallas Hospital Crowd | | |
| 2100.2 | 9:16 | 7/3/03 14:00 | TX-SOC | TX-SOC JIC liaison | JIC | Media: Dallas Hospital Crowd | | E-mail subject line Media inquiry from Media Dallas |
| 2100.3 | 9:26 | 7/3/03 14:00 | TX-SOC | JIC | TX-SOC JIC liaison | Media: Dallas Hospital Crowd | Approves wording of release to media | E-mail subject line Media inquiry from TX-SOC |

Fig. 5

| EVENT # | CLOCK TIME | OBJ. NO. | OBJECTIVE BEHAVIOR | EVENT PRIORITY | EVALUATOR (FUNCTIONAL POSITION) OBSERVATION | PERFORMANCE OUTCOME |
|---|---|---|---|---|---|---|
| 2100.0 | 9:10 | S2.50.50 | Provide content experitse to the JIC during the management of a crisis incident | Key | Receive telephone call. Log entry | Sat=accurate report of information |
| 2100.1 | 9:13 | | | | | |
| 2100.2 | 9:16 | S2.50.50 | Provide content experitse to the JIC during the management of a crisis incident | Key | Transmit e-mail. Log entry | Sat=timely and accurate report. Max 30 minutes. |
| 2100.3 | 9:26 | S3.50.70 | Manage information flow during a crisis incident | Key | Respond to e-mail. Log entry | Sat=timely response Max 10 minutes. |

SCENARIO WORKFLOW BASED ASSESSMENT SYSTEM AND METHOD

CROSS-REFERENCE TO RELATED APPLICATION

This Continuation application claims the benefit of the filing date of U.S. patent application Ser. No. 10/870,879 filed Jun. 17, 2004 and entitled "Scenario Workflow Based Assessment System and Method" which is incorporated herein by reference, and is now abandoned.

FIELD OF THE INVENTION

The invention pertains to systems and methods for assessing performance of participants during training exercises, or, rehearsing of missions. More particularly, the invention pertains to automated systems and methods to facilitate performance evaluation by providing real-time feedback to evaluators as an activity proceeds.

BACKGROUND OF THE INVENTION

The importance of training personnel to respond to events such as fires, violent domestic events, accidents or natural disasters (earthquakes, tornadoes, floods or the like) is well recognized. Similar comments apply to military training/mission rehearsal.

Training/rehearsal activities can last hours or days and can involve a large number of geographically dispersed participants. The value of collecting information as to how the exercise was carried out to facilitate an accurate and meaningful after-action review is also well known. One such system and method are disclosed in U.S. Pat. No. 6,106,297 issued Aug. 22, 2000, assigned to the assignee hereof and entitled "Distributed Interactive Simulation Exercise Manager System and Method". The '297 patent is hereby incorporated by reference.

While the primary value of conducting a performance session, such as a training or exercise session, is an effective and accurate assessment, (the basis of measurable and verifiable feedback to the session audience or participant, the after-action review (AAR)) obtaining such assessments during such sessions can be difficult. A problem in efficiently assessing, or evaluating, performance during complex tasks is defining what is important to be assessed at any given time, and what assessment criteria should be used.

It has been known in prior art to define assessment criteria and guidance prior to the assessment session. The assessor is then required to monitor performance activities to determine what type of events are taking place, recall and apply the applicable assessment criteria and assessment guidance, and record the applicable assessment. This approach is labor intensive, particularly for complex tasks involving teams of several individuals, and teams in different locations.

There continues to be a need for improved, preferably real-time evaluation systems and methods. Preferably such systems and methods will be flexible and cost effective to implement so as to be usable to provide assessment information for a wide range of civilian and military exercises.

SUMMARY OF THE INVENTION

A method which embodies the invention includes defining a scenario workflow relative to a selected situation, establishing a set of assessment criteria relative to a plurality of workflow related events, carrying out the scenario; as the scenario proceeds, retrieving assessment criteria for at least one active event; and providing the returned assessment criteria to an evaluator.

BRIEF DESCRIPTION OF THE DRAWINGS

FIG. 3 illustrates an exemplary scenario event;

FIG. 4 illustrates an exemplary workflow event list for the event of FIG. 3;

FIG. 5 illustrates an exemplary event assessment criteria list;

DETAILED DESCRIPTION OF THE EMBODIMENTS

Figure 1:
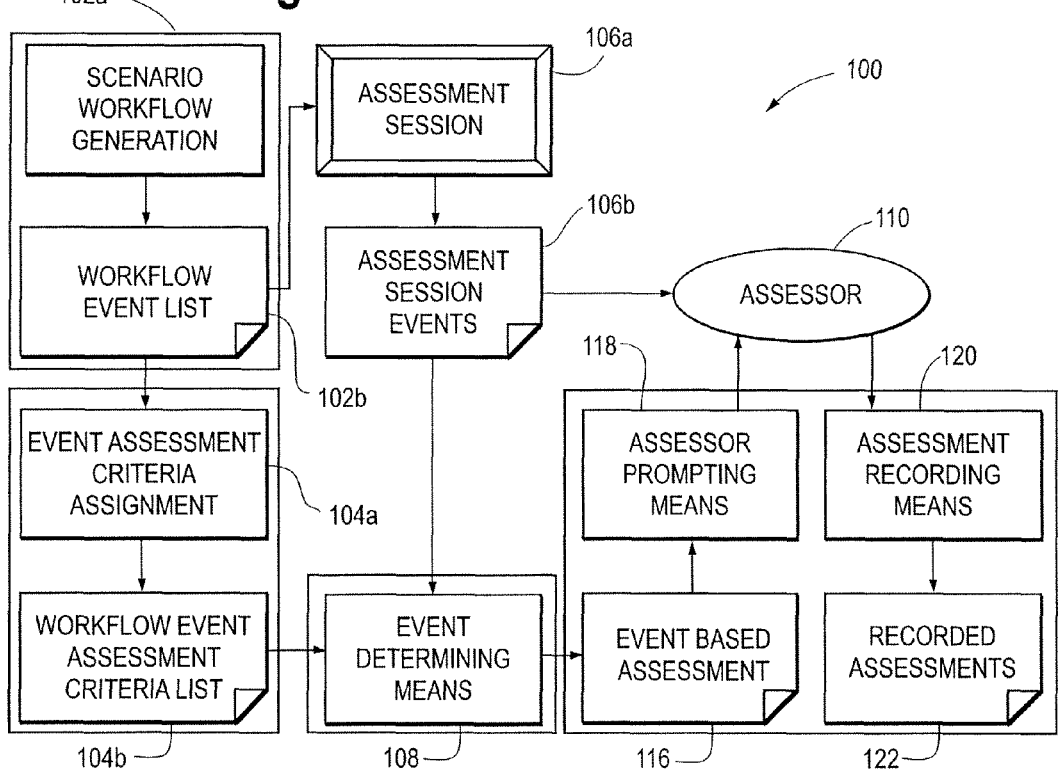
FIG. 1 is an over-view of a method in accordance with the invention.

While embodiments of this invention can take many different forms, specific embodiments thereof are shown in the drawings and will be described herein in detail with the understanding that the present disclosure is to be considered as an exemplification of the principles of the invention, and as a disclosure of the best mode of practicing the invention. It is not intended to limit the invention to the specific embodiment illustrated.

Systems and methods that embody the invention improve the efficiency of assessing performance during complex tasks, such as for distributed teams cooperating to achieve a common goal. Assessment accuracy is increased while reducing the work associated with recording behavior observations, preparing material for briefings and debriefings, and presenting feedback messages or comments during and after the assessment session.

Efficiency is increased because 1) the assessor is prompted during the assessment session with the applicable assessment criteria and guidance. An assessor can more quickly determine what assessment is needed; 2) the assessor is prompted with a tailored form for recording the assessment, so the assessor can record the assessment more quickly and accurately; 3) assessment responsibilities can be efficiently distributed and allocated across several assessors during the assessment session, so fewer assessors are needed; 4) expert subjective judgment guidance that is applicable to the assessment event can be captured from experts prior to the assessment session, and communicated to all assessors as required during the assessment session, so the assessors are not required to be experts.

Further, a method that embodies the invention automates performance assessment of an activity such as a training or a rehearsal exercise (the assessment session). The automation results in measurable or observable assessments of session events. In one embodiment, the method includes:

1) generating a scenario workflow which defines an event list or events that are expected to occur during an assessment session;

2) generating a workflow event assessment list which defines assessment criteria or guidance to be used during a respective event;

3) defining active events from the event list;

4) prompting the assessor regarding the applicable assessment criteria relative to a currently active event; and 5) recording the assessors' observations.

Alternative embodiments include:

a) Predefining the scenario workflow (e.g., a predefined script that always occurs in the same sequence).

b) The scenario workflow which defines an event list can be dynamically adjusted in response to the actions taken by the participants during the assessment session (e.g., a portion of the scenario workflow only occurs if the participants behave in a certain way referred to as a triggering behavior).

c) The scenario workflow which defines an event list can be dynamically adjusted by the evaluator based on accomplishment of assessment objectives during the assessment session (e.g., the evaluator may add scenario workflow to increase the workload during an assessment session—referred to as an "inject").

d) The workflow event list criteria can be predefined (e.g., the criteria to be used for an event is always the same whenever that event occurs in the scenario workflow).

e) The workflow event list assessment criteria can be dynamically adjusted in response to the actions taken by the participants during the assessment session (e.g., if the participants or audience respond to a scenario situation).

f) The workflow event list assessment criteria can be dynamically adjusted by the evaluator based on accomplishment of assessment objectives during the assessment session (e.g., if the evaluator may determine that a report preparer has demonstrated mastery of the primary criteria of submitting a properly formatted report in a timely fashion. The assessment criteria for future reporting could be adjusted to record whether the report preparer consults all relevant information sources needed for a quality report).

g) Defining what event from the event list are currently applicable can be based on human observation.

h) Defining what events from the event list are currently applicable can be based on observation by a computer-based agent.

i) Prompting the assessor regarding the applicable assessment criteria can be predefined (e.g., the assessor is always provided the same cue or input screen each time the applicable event occurs).

j) Prompting the assessor regarding the applicable assessment criteria can be dynamically adjusted in response to the actions taken by the audience during the assessment session (e.g., if the participants are frequently performing one type of task (Task A) and infrequently performs another type of task (Task B). In this regard, prompting the assessor regarding the applicable assessment criteria can be dynamically adjusted by the evaluator based on accomplishment of assessment objectives during the assessment session (e.g., if the evaluator determines that a report preparer has demonstrated mastery of the primary criteria of submitting a properly formatted report in a timely fashion. The assessment criteria for future reporting could be adjusted to record whether the report preparer consults all relevant information sources needed for a quality report).

In one system, that embodies this invention, the scenario workflow is defined to detail sequences or series of events that would result for a particular situation or course of action. The scenario workflow is then stored in a scenario workflow event database. The scenario workflow is analyzed to define what assessment criteria, if any, are applicable for each of the workflow events. These assessment criteria are added to the scenario workflow event database.

During the assessment session, the assessor or evaluator is provided an automated assessment device, or AAD. The AAD facilitates the use of hand-carried Tablet PCs by the evaluation team to coordinate evaluation responsibilities, display the pre-brief material and exercise status at any time during the exercise. As the scenario session proceeds, the scenario is monitored to determine what events are currently active.

By accessing the workflow event database, the system retrieves the details for the scenario event, including the assessment criteria list for that event. The evaluator is prompted with context-sensitive assessment criteria as key and critical events occur. As the evaluator records observations against each exercise goal, AAD provides immediate feedback of exercise goals that require additional attention. This significantly reduces the need for the evaluator to closely monitor actual scenario event execution while recording key observations. The AAD provides assistance to the evaluator to prepare the After Action Review (AAR).

Following the exercise, the evaluation team can quickly review evaluator comments grouped by exercise objectives and select candidates for discussion. During the review, the evaluator can use the AAD to identify and replay critical periods of audience actions that temporally relate to the evaluator's notes, while referencing the guidance provided during the exercise planning process. This automation and recall capability are not available using current manual data collection and synthesis techniques. The resultant After Action Reports provide invaluable lessons for the exercise participants, exercise coordinators and stakeholder agencies, including best practices that can be shared, thus, enhancing emergency preparedness.

FIG. 1 illustrates an overall view of a method 100 in accordance with the invention. In a step 102a a scenario workflow is generated. In a step 102b, a workflow event list is produced from the scenario workflow. The event list produced in step 102b defines those events which are expected to occur during a scenario assessment session.

In step 104a, event assessment criteria are assigned. In step 104b an event assessment criteria list is generated. Those of skill will understand that the workflow event list step 102b and event assessment criteria list step 104b could be stored as known to those of skill in the art for subsequent use.

In step 106a the scenario is initiated and the participants or audience participate in the ongoing scenario. Scenario workflow events unfold, step 106b and the assessor 110 is available to observe the participants' or audience's performance in response to the events 106b.

As the events unfold, step 106b, active events are recognized, step 108 either automatically or by personnel associated with implementing the session.

Active events trigger a retrieval of evaluation or assessment information, step 116. This information is forwarded to the assessor 110, step 118.

The assessors' remarks, comments and evaluations are received step 120 and stored for subsequent use, step 122 during after action review. Step 118 can be repeated as appropriate to provide supplemental assessment information to assessor 110 in view of previously recorded assessments step 122.

Figure 2:
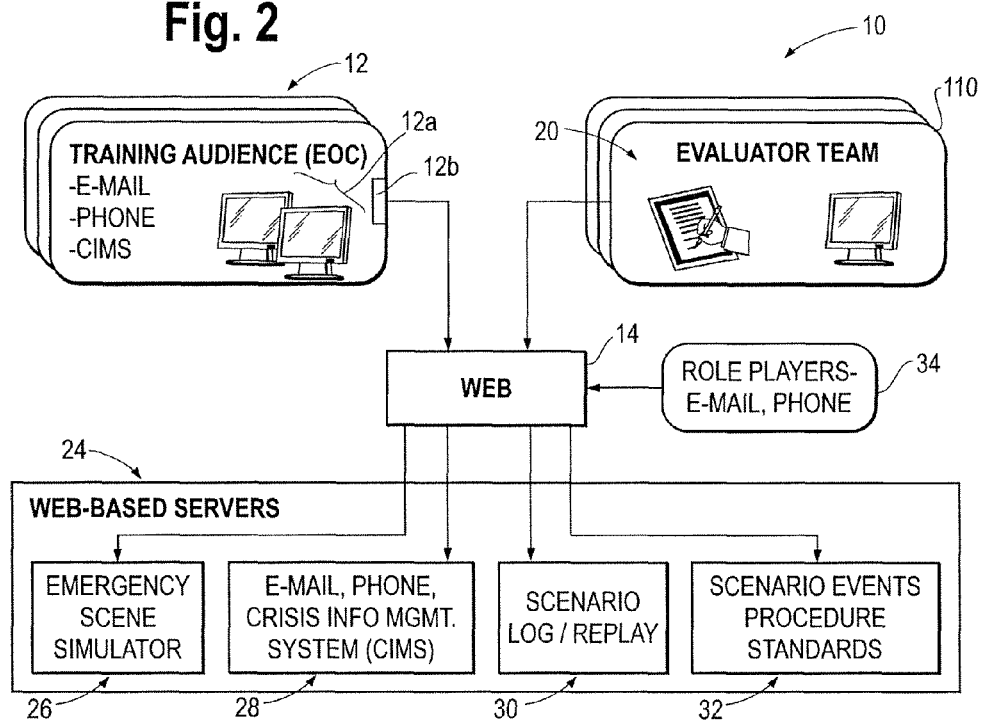
FIG. 2 illustrates a system in accordance with the invention.

FIG. 2 is a block diagram of a system 10 in accordance with the invention. System 10 represents one embodiment for implementing the methodology 100 of FIG. 1. As illustrated in FIG. 1, the training audience or participants 12 can communicate in a system 10 using, for example, personal computers which communicate via an intranet 12a and server 12b with the Internet 14. It will be understood that the participants 12 might participate in the subject scenario as multiple separate teams or as one organization working together to respond to the scenario. The participants or audience 12 can receive information via their personal computers and intranet 12a, such as by e-mail, telephone or any other form of information providing systems, such as video, crisis information management system (CIMS) or the like.

The evaluators 110 can wirelessly communicate with a server associated with web 14 using wireless personal communication devices indicated generally at 20. This wireless communication capability makes it possible for the evaluators to readily move among the audience or participants during the exercise.

A plurality of web based servers 24 provides useful information for the exercise. An emergency scene simulator system 26 provides a realistic representation of the subject scenario which requires the attention and action of the training audience or participants 12. The e-mail, phone, crisis information management system 28 provides realistic communication and coordination capabilities for the audience/participants 12. The scenario log/replay system 30 records audience communications, scenario events, and emergency scene related simulation activity. System 32 stores and makes available scenario events, procedures, standards, including the workflow event list, the event assessment criteria lists and related assessment information.

Role players 34 interact with the ongoing scenario and participants in the session via one or more web based servers. They can communicate with the audience or participants and/or control the sequence of events, the emergency scene simulator 26 and any other event related information.

As noted above, the scenario workflow is defined to detail sequences or series of events that would result for a particular situation or course of action, step 102a. A sample scenario is illustrated in FIG. 3 (a single event is shown for simplicity). The scenario events can then be stored in a system, or, database 32. It will be understood that the scenario events might be stored at a plurality of locations without departing from the spirit and scope of the invention.

For any given scenario event, there is a workflow procedure or event sequence, the workflow event list step 102b, that the audience is expected to follow in response to the occurrence of the scenario events. The expected workflow event list 102b for the sample scenario event in FIG. 3 is illustrated in FIG. 4. The scenario workflow event list 102b can then be stored in a database such as database 32, FIG. 2.

The scenario workflow is analyzed to define what assessment criteria, if any, are applicable for each of the workflow events step 104a. The assessment criteria list, step 104b, is created and stored in a database such as database 32. These criteria include a description of the objective behavior that is expected of the audience, an event priority used to designate relative priority of events, an Evaluator Observation column to cue the assessor as to what should be observed, and a Performance Outcome note to define the criteria for successful performance by the participants or audience. These criteria which can be added to the event list 102b from FIG. 4, are illustrated in FIG. 5, as the assessment criteria list step 104b. The assessment criteria list can be stored in a database such as 32.

Event determining software can be used to define what events from the event list are currently active or applicable, step 108. As the scenario session proceeds, the scenario is monitored to determine what events are currently active. This can be accomplished by monitoring the scenario activity and looking for a match of the expected "Trigger" condition for those scenario events that are expected but have not yet occurred (status="Pending").

Figure 6:
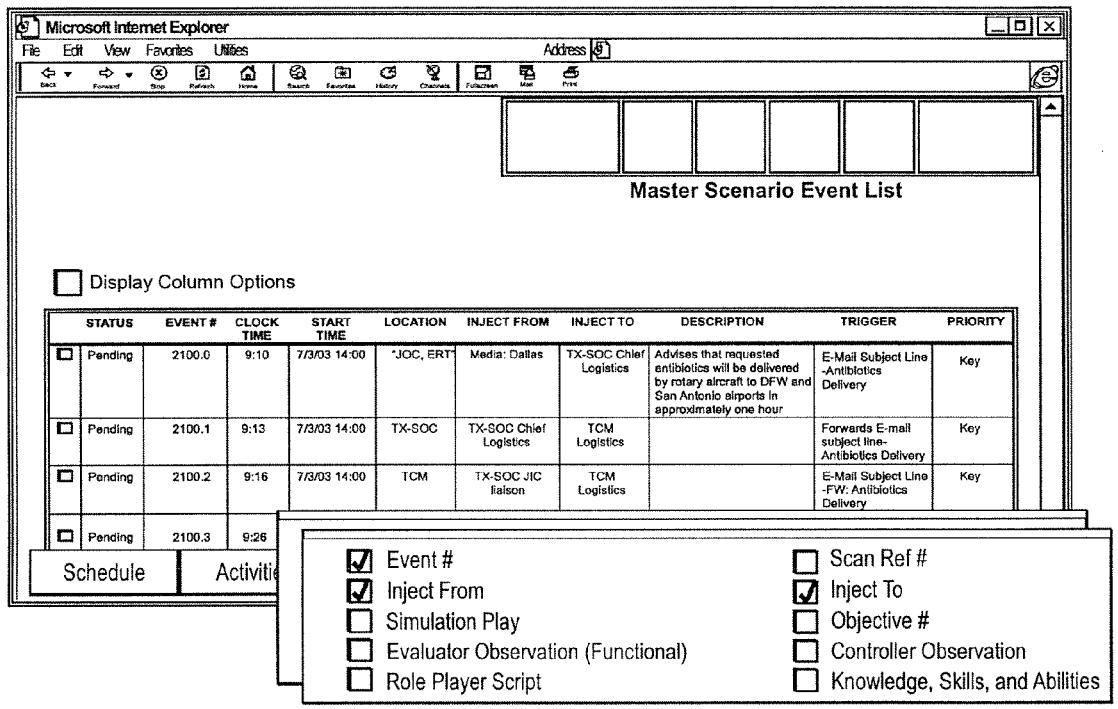
FIG. 6 illustrates a displayed event list for activating an event.

In one embodiment, active event identification can be accomplished by a human monitoring the event status see screen of FIG. 6, including all e-mail communication, as well as all voice between the role players and the training audience. When the monitor determines that an event had started, the monitor can designate that event as active (status="Active"), using a PC-based workstation. This status of the events that are currently applicable would be recorded, for example in database 32, and transmitted over the network to all role players 34 and evaluators 110.

By assessing the workflow event database, the details for the active scenario event, including the assessment criteria list step 104b for that event can be retrieved, for example from database 32. The evaluator 110 is prompted with context-sensitive assessment criteria as key and critical events occur via an automated assessment device, or AAD 20.

Figure 7A:
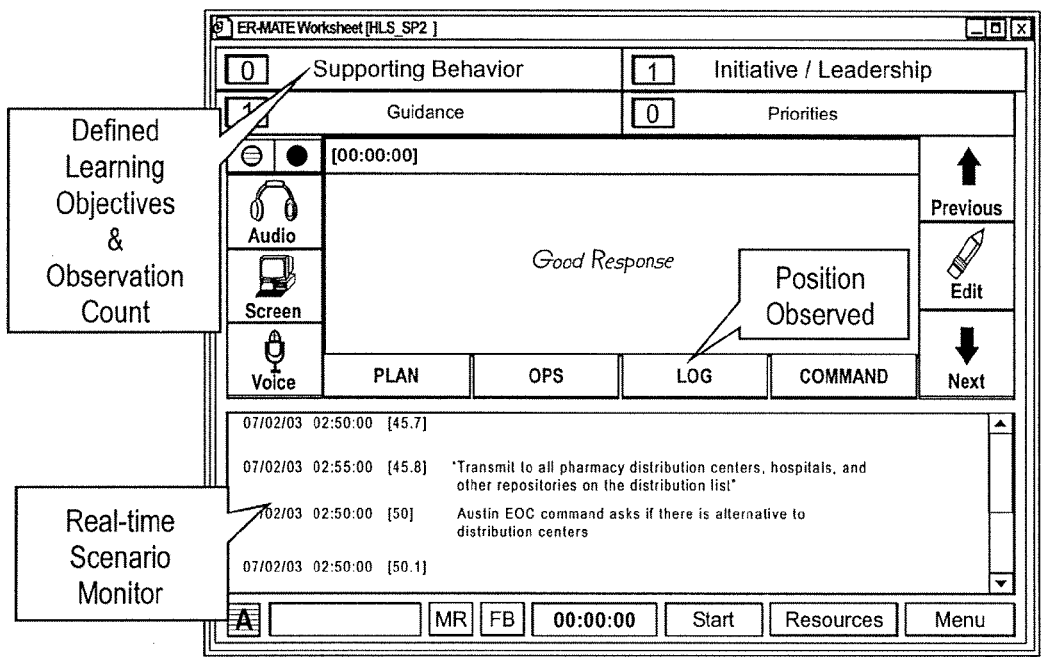
FIG. 7A illustrates an exemplary assessment entering screen.
Figure 7B:
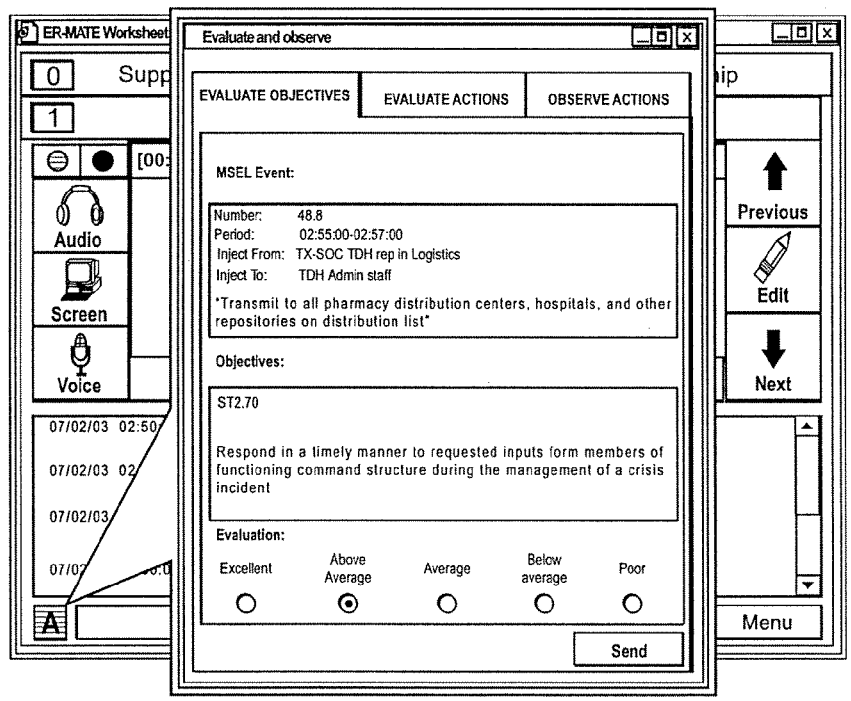
FIG. 7B illustrates an exemplary assessment prompting display for an active event.

The AAD 20, for example, hand-carried Tablet-PCs, enables the evaluation team 110 to coordinate evaluation responsibilities, display lists on other exercise material and exercise status at any time during the exercise. FIGS. 7A and 7B are sample displays as might be presented to the evaluation team 110.

FIG. 7A illustrates an exemplary normal AAD display where the scenario event monitor is shown in the bottom half of the display. The evaluator records assessments in the top half of the display. As the evaluator records observations against each exercise goal, the AAD provides immediate feedback of exercise goals that require additional attention step 118. This significantly reduces the need for the evaluator to closely monitor actual scenario event execution while recording key observations.

FIG. 7B illustrates AAD operation when a critical event has become active. The evaluator is cued to this activity by the "alert" button, lower left corner. Upon selecting the alert button, an Alert Display that is appropriate for assessing the current active event is displayed. This event-appropriate cue enables extremely efficient assessment.

It will be understood that none of the details pertaining to communication via intranet 12a or Internet 14 are limitations of the invention. Similarly, those of skill in the art will recognize that none of the size or location of the participants or audience 12, evaluator or assessment team(s) 110 or role players 34 are limitations of the invention.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed:

1. A method comprising:
   storing a scenario workflow comprising a plurality of event entries, each of the plurality of event entries corresponding to one of a plurality of events, wherein each of the plurality of event entries comprises a participant identifier identifying a particular participant of a plurality of participants to assess, and an assessment criterion for assessing a response of the particular participant to the corresponding event;
   determining that a first event of the plurality of events has become active;
   in response to determining that the first event has become active, sending a first notification to a communications device that the first event has become active;
   in response to the first notification, retrieving, by the communications device, the participant identifier and the assessment criterion associated with the event entry corresponding to the first event;

displaying, concurrently with the occurrence of the first event, the participant identifier and the assessment criterion on a display;

determining that a second event of the plurality of events has become active;

in response to determining that the second event has become active, sending a second notification to the communications device that the second event has become active;

in response to the second notification, retrieving, by the communications device, the participant identifier and the assessment criterion associated with the event entry corresponding to the second event;

displaying, concurrently with the occurrence of the second event, the participant identifier and the assessment criterion on the display, wherein each of the participant identifiers and the assessment criterion associated with the first event differs from the participant identifier and the assessment criterion associated with the second event; and wherein an assessment criterion associated with an active event of the plurality of events is dynamically adjusted in response to a previous action of a participant identified by the event entry that corresponds to the active event.

2. A method as in claim 1 where the assessment criterion is communicated, at least in part, wirelessly.

3. A method as in claim 1 which includes storing real-time evaluation information relative to the first event.

4. A method as in claim 3 which includes providing supplemental information relative to evaluating the first event, in view of previously stored observations.

5. A method as in claim 4 where the assessment criterion is communicated, at least in part, wirelessly.

6. A method as in claim 4 where the supplemental information is provided in real-time as the first event is taking place.

7. A method as in claim 6 which includes storing evaluation information during the first event grouped at least by predetermined objectives.

8. A method as in claim 7 which includes replaying stored information relative to the first event, in combination with temporally related, pre-stored, evaluation information.

9. A method as in claim 8 which includes preparing reports pertaining to scenario implementation.

10. A method as in claim 6 where the supplemental information is provided, in part, wirelessly to at least one evaluator.

11. A method as in claim 1 which includes carrying out the plurality of events related to the scenario workflow.

12. A method as in claim 11 which includes wirelessly receiving assessment criteria related to a plurality of different events.

13. A method as in claim 12 which includes providing wireless receivers to evaluators.

14. A system for assessing performance of participants in an exercise comprising:
a system for storing a predetermined workflow event list identifying a plurality of events, and predetermined event assessment criteria lists comprising a participant identifier and event assessment criteria corresponding to ones of the plurality of events;
a computer network coupled to the system;
a plurality of exercise participant computers coupled to the network;
a plurality of wireless assessment computers each of which is coupled to the network, each of which includes a display device;
event determining means in communication with the network, the event determining means operative to determine an occurrence of a first active event of the plurality of events, and responsive thereto retrieve details of the first active event and corresponding first participant identifier and first event assessment criteria from the system and transmit the details of the first active event and the corresponding first participant identifier and first event assessment criteria, respectively, to at least some of the exercise participant computers and to at least some of the assessment computers, with the first participant identifier and the first event assessment criteria displayed simultaneously thereon along with an assessment receiving input region, when the first active event is occurring;
the event determining means further operative to determine an occurrence of a second active event of the plurality of events, and responsive thereto retrieve details of the second active event and corresponding second participant identifier and second event assessment criteria from the system and transmit the details of the second active event and the corresponding second participant identifier and second event assessment criteria, respectively, to the at least some of the exercise participant computers and to the at least some of the assessment computers, with the second participant identifier and the second event assessment criteria displayed simultaneously thereon along with the assessment receiving input region, when the second active event is occurring, wherein each of the first participant identifier and the first assessment criteria associated with the first active event differs from the second participant identifier and the second assessment criteria associated with the second active event; and
wherein an assessment criterion associated with an active event of the plurality of events is dynamically adjusted in response to a previous action of a participant identified by the event entry that corresponds to the active event.

15. A system as in claim 14 wherein each of the plurality of wireless assessment computers includes a tablet for entry of assessment information.

16. A system as in claim 15 where the event determining means comprises a workstation.

17. A system as in claim 16 wherein displayed event information specifies an active event and an associated objective.

18. A system as in claim 14 which includes an exercise simulator system, a communications information management system, and a system to record audience communications and scenario events, all of which are coupled to the computer network.

19. An apparatus comprising:
circuitry adapted to store a workflow event list comprising a plurality of event entries, each of the plurality of event entries corresponding to one of a plurality of events, wherein each of the plurality of event entries comprises a participant identifier identifying a particular participant of a plurality of participants to assess, and an assessment criterion for the particular participant;
circuitry adapted to determine that a particular event of the plurality of events has become active;
circuitry adapted to, in response to determining that the particular event has become active, notify a communications device that the particular event has become active;
circuitry adapted to sequentially and visually provide a corresponding assessment criterion and the participant identifier to an evaluator for display on an evaluator unit in response to each event of the plurality of events where the assessment criterion and the participant identifier are provided at or about the time said each event occurs, and where the participant identifier and the assessment criterion associated with a first event of the plurality of events differs from the participant identifier and the assessment criterion associated with a consecutive second event of the plurality of events; and wherein an assessment criterion associated with an active event of the plurality of events is dynamically adjusted in response to a previous action of a participant identified by the event entry that corresponds to the active event.

20. An apparatus as in claim 19 which includes additional circuitry to provide assessment criteria to a plurality of evaluators.

21. An apparatus as in claim 19 which includes a plurality of evaluator units which display context-sensitive assessment criteria, the evaluator units each including a display device, and wherein at least some of the evaluator units communicate wirelessly with the circuitry.

22. A method for evaluating a plurality of participants participating in a scenario, comprising:

generating a workflow scenario involving a plurality of participants that comprises a plurality of event entries, each of the plurality of event entries corresponding to one of a plurality of consecutive events and comprising a participant identifier identifying a particular participant of the plurality of participants to assess, and an assessment criterion identifying a desired response of the particular participant in response to the corresponding consecutive event;

initiating the workflow scenario;

consecutively determining, by a first device, when each of the plurality of consecutive events becomes active;

in response to each consecutive determination, concurrently:

sending, by the first device, a notification to a same wireless assessment computer that the each of the plurality of consecutive events has become active;

retrieving, by the same wireless assessment computer, the participant identifier and the assessment criterion associated with the assessment event entry corresponding to the each of the plurality of consecutive events;

displaying, by the same wireless assessment computer, the participant identifier and the assessment criterion on a display;

receiving, by the same wireless assessment computer, an assessment; and storing, by the same wireless assessment computer, the assessment in association with the each of the plurality of consecutive events, wherein the participant identifier and the assessment criterion associated with a first event of the plurality of consecutive events each differ from the participant identifier and the assessment criterion associated with a consecutive second event of the plurality of consecutive events; and wherein an assessment criterion associated with an active event of the plurality of events is dynamically adjusted in response to a previous action of a participant identified by the event entry that corresponds to the active event.

* * * * *